July 12, 1955

R. H. MURRAY 2,712,874

PORTABLE AIRCRAFT LIFTING CRADLE

Filed May 12, 1950

INVENTOR.
ROBERT H. MURRAY
BY
George C. Sullivan
Agent

July 12, 1955 R. H. MURRAY 2,712,874
PORTABLE AIRCRAFT LIFTING CRADLE
Filed May 12, 1950 4 Sheets-Sheet 3
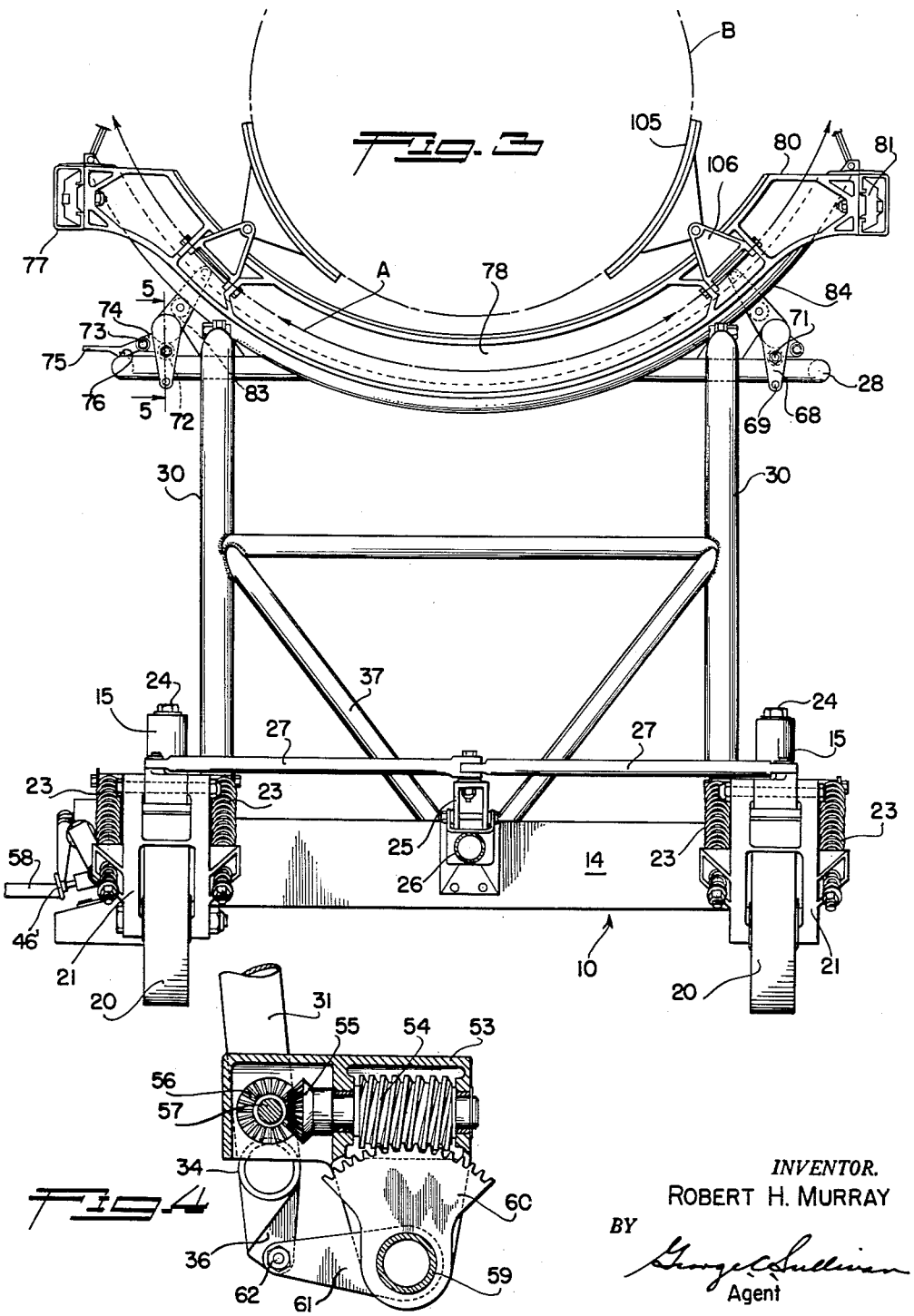
*INVENTOR.*
ROBERT H. MURRAY
BY
*George C. Sullivan*
Agent

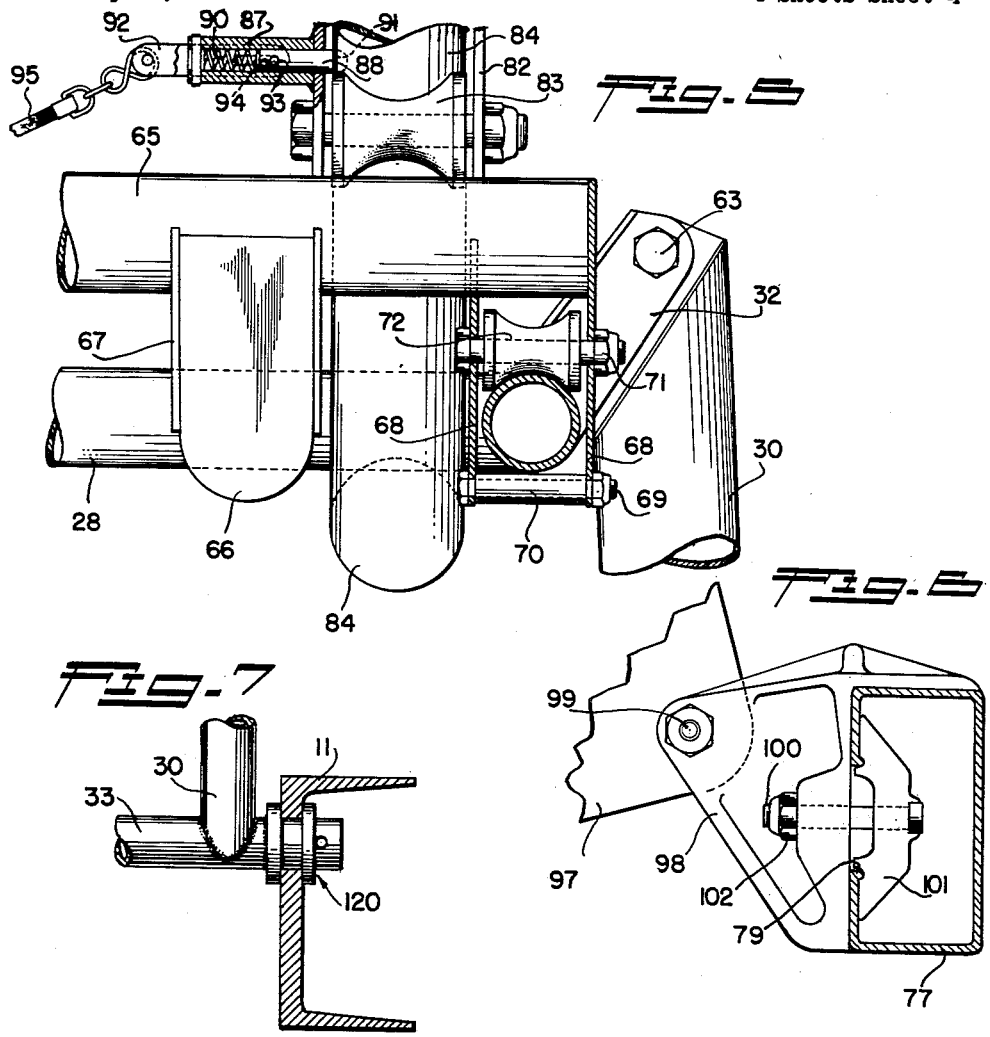

United States Patent Office 2,712,874
Patented July 12, 1955

2,712,874

PORTABLE AIRCRAFT LIFTING CRADLE

Robert H. Murray, North Hollywood, Calif., assignor to Lockheed Aircraft Corporation, Burbank, Calif.

Application May 12, 1950, Serial No. 161,704

5 Claims. (Cl. 214—1)

This invention relates to portable object handling cradles and relates more particularly to portable dollies or cradles for facilitating the installation and removal of aircraft fuselage sections and other aircraft components and for use in connection with the servicing and loading of aircraft.

The maintenance of jet-type fighter aircraft requires periodic removal of the engine and in airplanes where the engine is contained within the fuselage structure, the aft section of the fuselage must be removed in order to gain access to the engine. The fuselage sections must also be moved about the field or hangar, and stored, and following servicing of the engine the fuselage section must be lifted in place and reattached to the airplane. In a like manner it is necessary to install and remove wing tip tanks and other parts and components of the airplane and it is frequently desired to have available a raised portable support that can be used as a work platform, loading platform, etc. It is important that such a device be light in weight, readily adapted for use with various aircraft, and capable of being folded or demounted into a compact package for transport by air.

It is, therefore, a general object of this invention to provide a conveniently manipulated portable lifting cradle that may be employed to handle fuselage sections, wing tip tanks, etc., and to serve as a working platform and loading platform, the cradle being light in weight and capable of being folded or collapsed into a small, lightweight and compact unit for shipment or transport by air.

Another object of the invention is to provide a dolly or cradle of this character that is provided with wheels so as to be readily moved from place to place and that is adjustable to support or carry its load at various elevations and in various positions.

Another object of the invention is to provide a cradle of the character referred to incorporating hydraulic means for elevating the fuselage section, or other object, to the required height and having means for tilting or pitching the object, moving the same transversely and rolling or moving the same about a fore and aft axis. The cradle structure is operable to raise the load to a desired height and to tilt the load in the manner required and is such that the load may be readily moved transversely and rolled so as to bring it into position for attachment or reattachment to the airplane. The mechanisms for effecting the raising and lowering of the load and for tilting the load are simple and light in weight and the device is constructed to permit the manual movement of the load about the fore and aft axis and in the transverse direction within substantial ranges to satisfactorily accomplish mating and disassembling of the airplane parts.

A further object of the invention is to provide a portable cradle for this class incorporating an upper structure shaped to receive fuselage sections, having replaceable pads designed to engage the fuselage sections, etc. of specific airplanes, and designed to receive planks or a platform for workmen.

Other objectives and features will become apparent from the following detailed description of a typical preferred embodiment of the invention throughout which description reference is made to the accompanying drawings, wherein:

Figure 3 is a front elevation of the device with the tow bar appearing in vertical cross section;

Figure 4 is a fragmentary view illustrating the gear mechanism for producing tilting of the upper load carrying structure with the case appearing in vertical cross section;

Figure 5 is an enlarged fragmentary vertical sectional view taken substantially as indicated by line 5—5 on Figure 3;

Figure 6 is an enlarged fragmentary vertical sectional view taken as indicated by line 6—6 on Figure 2; and Figure 7 is an enlarged fragmentary sectional view illustrating the pivotal mounting of the forward leg assembly on the base frame.

Figure 1:
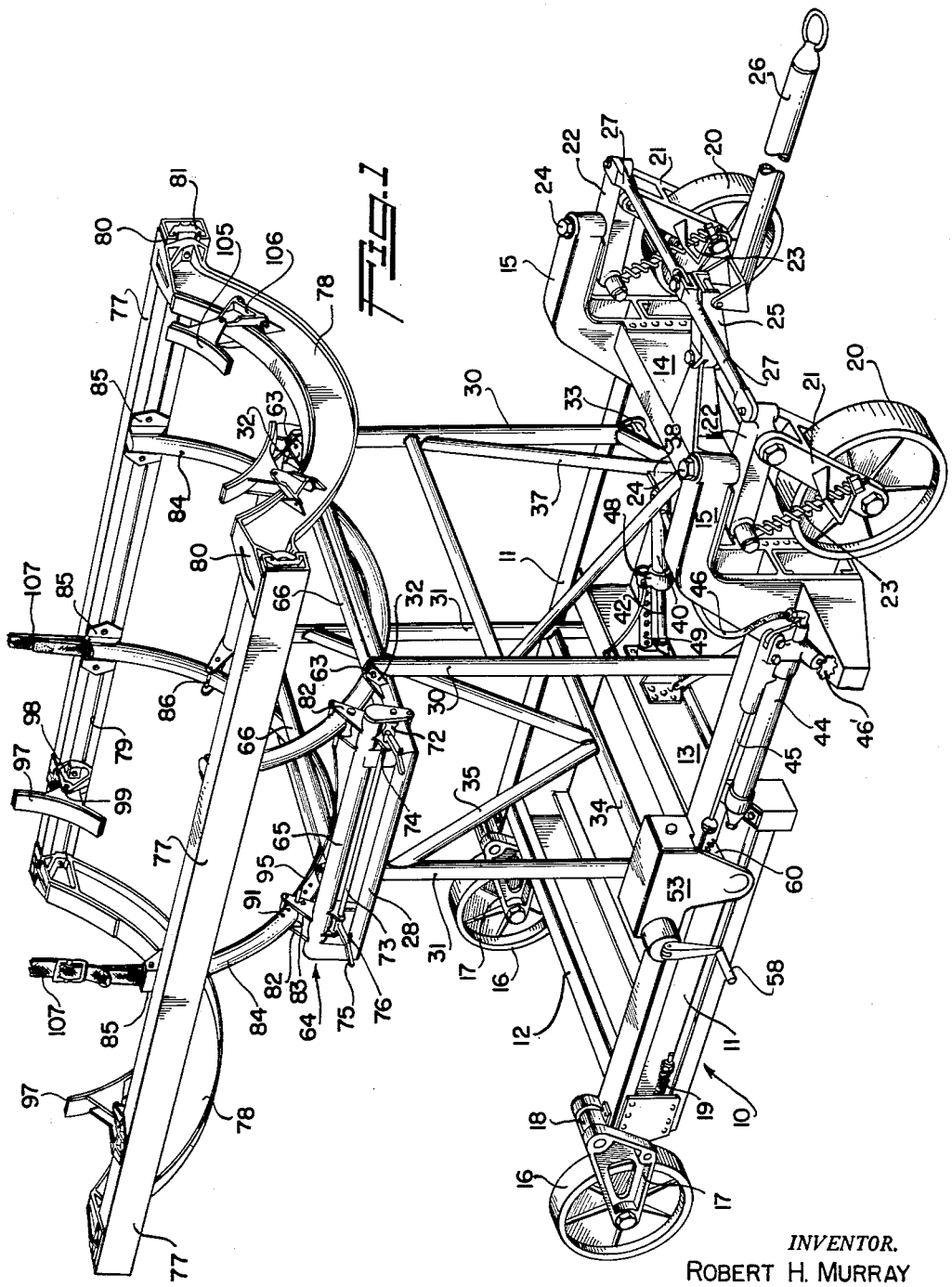
Figure 1 is a perspective view of the cradle of the invention showing the upper structure in an elevated position.
Figure 2:
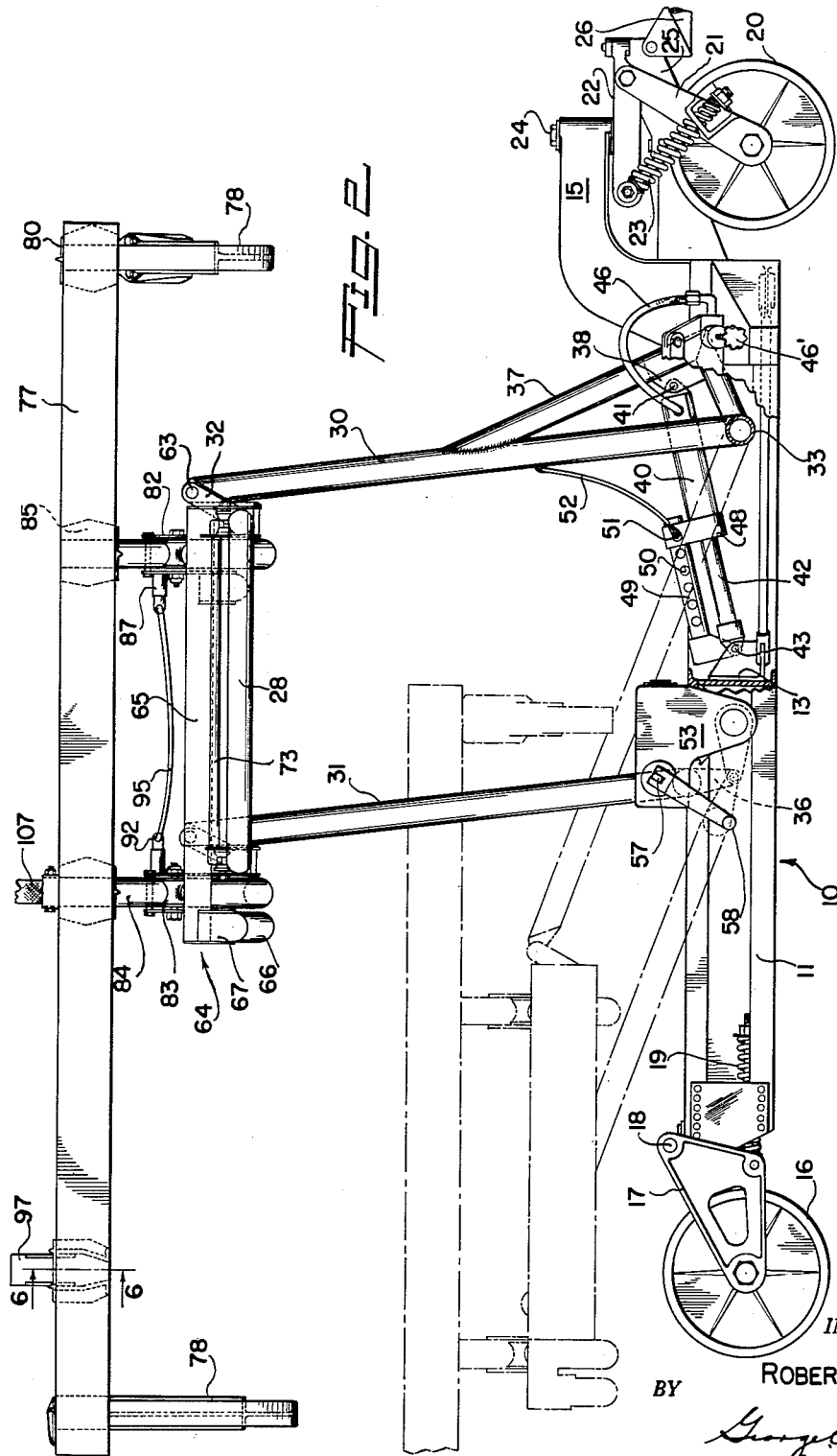
Figure 2 is a side elevation of the device with broken lines illustrating a partially lowered position of the upper structure.

The portable dolly or cradle of the invention includes a generally rectangular lower frame 10 having side members 11, rear and intermediate transverse members 12 and 13 and a somewhat elevated front member 14. The front frame member 14 extends between raised forwardly projecting arms 15 on the side members 11. It is preferred to construct the various frame members of channel or angle stock to reduce the weight of the frame structure to a minimum. In accordance with the broader aspects of the invention any suitable or desired system of wheels may be employed to support the frame 10 for movement. I have shown rear wheels 16 rotatably mounted on yokes 17 which, in turn, are pivoted in horizontal bearings 18 at the rear end of the frame 10. Shock absorbing spring means 19 are associated with the yokes 17 to absorb shocks which may accompany movement of the device across the field or floor. The front wheels 20 of the portable frame 10 are rotatably supported in yokes 21 which, in turn, are pivoted on horizontal fore and aft members 22 disposed at the undersides of the frame arms 15. Shock absorbing spring means 23 are connected between the yokes 21 and the members 22. King pins 24 pivotally mount the members 22 on the arms 15 of the frame 10. The wheels 20 are steerable, the pivoted members 22 being operatively associated with the draw bar means. I have shown a hitch clevis 25 pivotally secured to the forward end of the frame 10 with a draw bar 26, or the equivalent, extending forwardly from the same. Links or tie-rods 27 extend between and are pivotally connected with the wheel mounting members 22 and draw bar clevis 25 so that the wheels 20 are directed or steered by the draw bar 26. The wheels 16 and 20 may, of course, be equipped with appropriate solid or pneumatic tires.

The upper structure of the dolly or cradle includes a rectangular frame 28 constructed of tubular stock or pipe and arranged to have its longitudinal axis extend transversely of the lower frame 10. This upper frame 28 serves to carry the rollable and transversely movable work or object supporting elements to be subsequently described. The frame 28 is operated and carried by two pairs of legs 30 and 31 whose upper ends are attached to the transverse members or tubes of the frame 28 by offsetting arms 32. The lower ends of the forward legs 30 are secured to a horizontal tube or shaft 33 which, in turn, is rotatably or pivotally secured in the side members 11 of the base frame 10 as shown at 120 in Figure 7. The lower portions of the rear legs 31 are connected by a horizontal rod or tube 34 and the assembly of the rear legs is braced by diagonals 35. One rear leg 31 has a downward extension or arm 36 which is operatively connected with the mechanism for tilting or pitching the frame 28, as will be subsequently described, the arm 36 and said mechanism serving to mount the legs 31 on the base frame 10. A pair of downwardly and forwardly convergent pipes or tubes 37 extends from the forward legs 30 to a plate or bracket 38.

In accordance with the invention, hydraulic or fluid pressure actuated means is provided to elevate the upper frame 28 from a position at the base frame 10 to any selected height. This means includes a cylinder and piston mechanism connected between the bracket 38 and the intermediate transverse frame member 13. The mechanism comprises a cylinder 40 pivotally secured to the bracket 38 at 41 and a plunger or piston 42 pivotally mounted on the frame member 13 at 43. A fluid pressure developing unit is carried by the frame 10 for supplying actuating pressure to the cylinder and piston mechanism and is in the form of a reservoir and pump device 44 having a manual operating lever 45. The pump mechanism 44 may be arranged at the outer side of one of the frame members 11 adjacent the forward end of the frame 10 and a flexible tube or hose 46 conducts the fluid under pressure from the pump unit to the cylinder 40. A manually operable valve 46' is provided on the pump 44 to provide for the controlled return of the fluid under pressure from the cylinder 40 to the reservoir and pump unit 44. Manually operable pumps having reservoirs associated therewith are well known in the art and accordingly the details of the unit 44 are omitted from the present disclosure. It will be seen that when the pump 44 is actuated, fluid under pressure is supplied to the cylinder 40 to pivot the forward legs 30 and thus elevate or swing the platform 28 upwardly and that the valve 46' may be subsequently controlled or opened to allow the frame 28 to lower.

It is desirable to prevent premature or unintentional lowering of the upper frame 28 and the invention provides positive yet manually releasable latch means for locking the cylinder and piston mechanism 40—42 in any one of a plurality of extended or operated positions. This means include a collar 48 on the lower end of the cylinder 40 and a rod or tube 49 secured at the pivotal mounting 43 of the piston 42 and slidably received in the collar 48. The tube 49 has a plurality of longitudinally spaced transverse openings 50 and a pin 51 is adapted to be engaged through the collar 48 and entered in any one of the openings 50 to positively hold the cylinder 40 and the upper frame 28 in the selected extended position. A flexible element 52 in the form of a cord, cable, or chain, may attach the pin 51 to an adjacent leg 30 to prevent loss of the latch pin.

As mentioned above, means is provided to tilt or pitch the upper frame 28 and the parts associated therewith. A worm 54 is rotatably mounted in a case 53 arranged on a side member 11 of the lower frame 10 and the worm carries a bevel pinion 55 which meshes with a pinion 56 fixed on a horizontal shaft 57. The shaft 57 extends outwardly from the gear case 53 and carries a hand operating crank 58. A transverse shaft 59 is rotatably mounted in the case 53 below the worm 54 and a sector gear 60 is fixed to this shaft to mesh with the worm 54. A crank arm 61 is fixed on the shaft 59 of the sector 60 and is operatively connected with the arm 36 of the leg 31 at 62, as best shown in Figure 4. The above described offsetting arms 32 of the upper frame 28 have pivotal clevis connections 63 with the legs 30 and 31 to permit pitching or tilting of the frame 28 relative to the legs 30. Upon operation of the hand crank 58 the crank arm 61 is moved to pivot or swing the rear legs 31 and thus tilt or pitch the upper frame 28 about the axis of the pivotal connections 63 at the legs 30. It is to be observed that where the gear mechanism for effecting tilting of the upper frame 28 is of the worm type there is no necessity for providing additional means to lock the frame in the selected tilted position.

The assembly carried by the raisable and tiltable upper frame 28 includes what I will term a carriage 64 supported on the frame for lateral or transverse movement. The carriage 64 includes end members 65 spaced above the frame 28 and transverse members 66 extending between and connected with the end members. The transverse members 66 lie in substantially the same plane as the frame 28 and are connected with the end members 65 by brackets or plates 67. The members 65 and 66 are preferably tubular to reduce the weight. Spaced plates 68, which are welded or otherwise fixed to the end members 65 of the carriage 64, extend downwardly from the carriage and are connected adjacent their lower ends by bolts 69 which pass beneath the frame 28. The bolts 69 carry tubular spacers or rollers 70 which may cooperate with the frame 28 to hold the carriage 64 against upward displacement from the frame. Bolts or shafts 71 also extend between plates 68 and carry rotatable rollers 72 which ride on the front and rear members of the frame 28 to support the carriage 64 for movement on the frame. The rollers 72 are grooved or contoured to conform with the tubular members of the frame 28, as best illustrated in Figure 5. There are four sets of plates 68 and rollers 72, one at each corner of the carriage 64 so that the carriage is dependably supported on the frame 28. I prefer to provide means for holding the carriage 64 against movement on the frame 28 when the cradle or dolly is being moved about and at other times. This means may comprise a rod 73 rotatably carried by brackets 74 at one end of the carriage 64. Fingers 75 project from the rod 73 and cooperate with keys or pins 76 on the frame 28 to prevent unwanted movement of the carriage. The fingers 75 are readily raised out of engagement with the pins 76 to release the carriage 64 for transverse movement or adjustment on the frame 28.

The dolly further includes a pair of spaced longitudinally extending beams 77 of substantial length arranged above the carriage 64. The beams 77 are connected at their opposite ends by transversely extending downwardly bowed cradle members or re-entrant members 78. The beams 77 are in the nature of hollow extrusions having closed outer sides, horizontal upper and lower flanges and inner side walls provided with longitudinal slots 79, as best shown in Figure 6. The re-entrant cradle members 78 may be in the form of castings and may be given practically any desired shape, depending upon the character of the objects to be handled or serviced. In the case illustrated, the members 78 have flat, horizontal opposite end portions 80 which overlap and rest upon the end parts of the side beams 77 while major portions of the members 78 are re-entrant or arcuate curving downwardly and inwardly from their ends. The opposite ends of the cradle members 78 are secured to the side beams 77 by bolt and block connections 81. It is to be observed that the upper sides of the side beams 77 and the portions 80 of the cradle members 78 present extensive surfaces for the support of planks, a platform, or the like.

The assembly or cradle unit comprising the beams 77 and members 78 is supported on the above described carriage 64 for rolling adjustment, that is for movement about an axis extending fore and aft of the dolly. The means for supporting the cradle unit 77—78 on the carriage 64 includes upwardly and inwardly projecting brackets 82 on the end members 65 of the carriage. These brackets 82 each carry a rotatable roller 83. Arcuate tubes 84 extend between and are attached to the inner sides of the beams 77 by bolt and block connections 85. The tubes 84, which are preferably of identical curvature curved downwardly and inwardly from the beams 77 and are received in the brackets 82 to rest or ride on the rollers 83. The rollers 83 are contoured to conform with the curved tubes 84. It will be seen that the engagement of the tubes 84 on the rollers 83 is such that the upper cradle unit 77—78 is adapted to be rotated or rolled about a substantially horizontal axis extending fore and aft of the dolly. Bolts 86 or the like, on the brackets 82, extend over the tubes 84 to prevent displacement of the tubes from the brackets. The arrows A in Figure 3 indicate the direction of rotation or rolling adjustment of the cradle unit 77—78.

Means is provided for locking or retaining the adjustable cradle unit 77—78 in selected rotated positions. As best illustrated in Figures 1 and 5, this means includes tubular guides 87 on two aligned brackets 82 and lock pins 88 slidable in the guides. Springs 90 urge the pins 88 against the adjacent arcuate tubes 84. A plurality of spaced openings 91 is provided in each curved tube 84 to receive the related lock pins 88. With the pins 88 engaged in selected aligned openings 91, the cradle unit 77—78 is effectively locked or secured against movement. Tubes or yokes 92 slide on the exteriors of the guides 87 and are connected with the related lock pins 88 by transverse pins 93 operating in longitudinal slots in the walls of the guides. By moving the yokes 92 outwardly the lock pins 88 may be withdrawn from their openings 91 to allow the cradle unit 77—78 to be rotated or rolled. A chain, chord, rope, or the like, 95, may be attached to the two yokes 92 so that the two lock pins 91 may be simultaneously released by merely pulling on the rope. When the rope 95 is released the springs 90 actuate the pins 88 and they re-engage in selected openings 91 when the cradle unit 77—78 is brought to the desired position.

The cradle unit 77—78 may be equipped with supports, adaptors, or pads of various sizes and in different locations to adapt the dolly to handle aft fuselage sections of various makes and types of airplanes as well as other aircraft parts and components such as wing tip tanks, aerial bombs, etc. In the drawings I have shown certain pads arranged on the beam members 77 and end cradle members 78 to receive and support a generally cylindrical object B indicated in broken lines in Figure 3. Shoes or pads 97 curved to conform with the object B are pivoted to brackets 98 at 99. These brackets 98 are shaped to engage against the tops and inner sides of the beams 77 adjacent the rear ends of the beams. Studs or bolts 100 pass through openings in the brackets 98 and through the above described slots 79 in the beams 77 and have their inner ends secured in blocks 101 within the beam. This arrangement is best shown in Figure 6. Upon tightening the nuts 102 on the bolts 100, the brackets 98 are securely attached to the beams 77. It will be apparent that with this form of attachment the shoes or pads 97 may be mounted on the beams 77 at any selected points. The above mentioned bolt and block connections 81 may be the same as the connection illustrated in detail in Figure 6 so that the members 78 may be adjusted along the beams 77 and may be replaced by similar transverse end members of different configurations. Furthermore, the bolt and block connections 85 at the arcuate tubes 84 may also be of the character illustrated in detail in Figure 6. Appropriately shaped shoes or pads 105 are pivotally mounted on brackets 106 secured to the arcuate cradle members 78 to provide a four-point support for the object B, it being understood that the number, character and location of the supports or pads on the members 77 and 78 may be varied to adapt the dolly to carry various objects. In addition to the pads 97 and 105 I prefer to provide one or more straps 107 for retaining the object B on the cradle. The straps 107 may be anchored at the connections 85, as illustrated in Figure 1, and are adapted to engage over or around the object B.

Where practical, the various parts of the dolly are constructed of an aluminum alloy or other light-weight material and, as above described, many of the parts are fabricated from tubular stock so that the device is of minimum weight for economical transport by air. Furthermore, the device is compact and adapted to be readily disassembled to form a small package or unit. As shown in broken lines in Figure 1, the upper cradle structure may be lowered to be adjacent the base frame 10 to facilitate handling and shipment. If desired, the carriage 64 and the upper cradle structure 77—78 with their associated parts, may be easily disconnected and then stacked or arranged on the lower assembly to constitute an extremely small, compact unit for ready economical shipment.

It is believed that the operation of the dolly will be readily understood from the foregoing detailed description. The upper cradle structure, with or without a load, may be elevated to the desired position by simply operating the lever or handle 45 of the pump unit 44. The lock pin 51 then engages or snaps into an opening 50 to prevent accidental lowering of the upper structure and load. Upon releasing the fingers 75 from the pins 76 the carriage 64 may be moved laterally as required and upon releasing the pins 88 the upper structure and the load B may be rolled or rotated. To pitch or tilt the load B the hand crank 58 is operated to move or swing the rear legs 31 as previously described. By means of these several adjustments or motions the object or load B may be readily mated with its companion part on the airplane for attachment thereto. Thus the dolly is well adapted for the installation, servicing, removal, etc. of fuselage sections, wing tip tanks, aerial bombs, etc. Where the device is to be used as a working platform, loading platform, or the like, the pads 97 are removed and planks or a wooden platform is secured to the upper beams 77. In such case the dolly forms a conveniently elevated platform that may be employed by workmen in servicing the airplane, loading the airplane, and performing similar operations.

Having described only a typical form of the invention I do not wish to be limited to the specific details herein set forth, but wish to reserve to myself any variations or modifications that may appear to those skilled in the art and/or fall within the scope of the following claims.

I claim:

1. An object handling dolly comprising a wheeled base, an upper structure, lever means coupling the upper structure with the base for vertical movement relative thereto, means on the base for raising said structure, a carriage supported on said structure for lateral translation, and a cradle on the carriage including longitudinally extending hollow beams having slots in their walls, object supporting pads, blocks in the beams, and bolts passing through the slots from the blocks to the pads for securing the pads to the beams.

2. An object handling dolly comprising a base frame, an upper structure, lever means coupling said structure with the base, a cylinder and piston mechanism connected between the base frame and lever means, means supplying fluid pressure to said mechanism to actuate the same and thus elevate said structure, releasable means associated with said cylinder and piston mechanism for preventing downward retraction of said structure including a member pivotally secured to the base frame to extend parallel with said mechanism, the member having longitudinally spaced openings, a collar on said mechanism slidably receiving said member, and a removable part for cooperating the collar and a selected opening in said member, and manually operable valve means associated with said mechanism to control lowering of said structure upon removal of said part.

3. A dolly for handling aircraft components comprising a wheeled base frame, an upper frame, a first set of legs having its lower end pivotally mounted on said base frame and its upper end supportingly pivotally connected with one end of said upper frame, a second set of legs having its upper end supportingly pivotally connected with the other end of said upper frame, fluid pressure actuated means connected between said base frame and said first set of legs for raising and lowering the upper frame, a manually operable mechanism on the base frame supporting the lower end of said second set of legs and operable to tilt the upper frame, a carriage supported on said upper frame for bodily translation of said carriage in a direction transverse of the fore and aft axis of said base frame, and a cradle for an aircraft component mounted on the carriage for rolling movement about a fore and aft axis, including a plurality of component-contour-conforming pad members to support said aircraft component, pivotally mounted on said cradle.

4. A dolly for handling aircraft components comprising a wheeled base having a fore and aft axis, an upper frame, lever means coupling said upper frame with said base for vertical movement thereof, means on said base for raising said frame, a carriage supported on said upper frame for bodily translation thereon in a direction transverse of said fore and aft axis of said wheeled base, a cradle above said carriage for receiving an aircraft component, said cradle including spaced fore and aft extending side rails, re-entrant end members connecting said side rails, and component supporting pads pivotally mounted on said rails and said re-entrant end members, and means supporting said cradle for rolling movement about an axis above said carriage and substantially parallel with said first named axis including arcuate members on the cradle curved generally about said second named axis, spaced rollers on said carriage carrying said arcuate members, said arcuate members being curved substantially concentrically with said second named axis, and releasable means for holding said cradle against movement about said second axis in any one of a plurality of positions.

5. A dolly for handling aircraft components comprising a wheeled base frame, an upper frame, a first set of legs having its lower end pivotally mounted on said base frame and its upper end supportingly pivotally connected with one end of said upper frame, a second set of legs having its upper end supportingly pivotally connected with the other end of said upper frame, fluid pressure actuated means connected between said base frame and said first set of legs for raising and lowering the upper frame, a manually operable mechanism on said base frame supporting the lower end of said second set of legs and operable to tilt the upper frame, said mechanism including a crank on said second set of legs, worm gear means on the base frame including a manual operating crank, and a driven shaft operatively connected with the first named crank, a carriage supported on said upper frame for bodily translation of said carriage in a direction transverse of the fore and aft axis of said base frame, and a cradle for an aircraft component mounted on the carriage for rolling movement about a fore and aft axis.

References Cited in the file of this patent
UNITED STATES PATENTS

| | | |
|---|---|---|
| 1,834,294 | Spahn | Dec. 1, 1931 |
| 1,932,596 | Osgood | Oct. 31, 1933 |
| 1,953,056 | Olen | Mar. 27, 1934 |
| 2,348,899 | Guignard | May 16, 1944 |
| 2,454,840 | Ryan | Nov. 30, 1948 |
| 2,479,623 | Johnson | Aug. 23, 1949 |
| 2,512,150 | Geren | June 20, 1950 |
| 2,523,734 | Stephenson et al. | Sept. 26, 1950 |